US008811437B2

(12) United States Patent
Eicchorn

(10) Patent No.: US 8,811,437 B2
(45) Date of Patent: Aug. 19, 2014

(54) LASER DEVICE WITH PHASE FRONT REGULATION

(75) Inventor: Marc Eicchorn, Rickenbach (DE)

(73) Assignee: Institut Franco-Allemand de Recherches de Saint-Louis, Saint Louis (FR)

(*) Notice: Subject to any disclaimer, the term of this patent is extended or adjusted under 35 U.S.C. 154(b) by 0 days.

(21) Appl. No.: 13/242,728

(22) Filed: Sep. 23, 2011

(65) Prior Publication Data

US 2012/0093182 A1    Apr. 19, 2012

(30) Foreign Application Priority Data

Oct. 14, 2010   (DE) .......................... 10 2010 048 294

(51) Int. Cl.
*H01S 3/13* (2006.01)
*H01S 3/081* (2006.01)
(52) U.S. Cl.
USPC ........................................ 372/29.023; 372/93
(58) Field of Classification Search
USPC .................................... 372/29.02–29.023, 93
See application file for complete search history.

(56) References Cited

U.S. PATENT DOCUMENTS

| | | | |
|---|---|---|---|
| 8,078,245 B2* | 12/2011 | Daly et al. ..................... | 600/319 |
| 2003/0198265 A1* | 10/2003 | Vetrovec .......................... | 372/35 |
| 2006/0239312 A1 | 10/2006 | Kewitsch et al. | |
| 2009/0028198 A1 | 1/2009 | Belenkii | |
| 2010/0117009 A1 | 5/2010 | Moriya et al. | |
| 2010/0226396 A1* | 9/2010 | Hollemann ..................... | 372/10 |

FOREIGN PATENT DOCUMENTS

| | | |
|---|---|---|
| DE | 92 15 361.5 U1 | 4/1994 |
| DE | 699 19 929 T2 | 9/2005 |
| DE | 10 2007 049 436 B4 | 7/2009 |
| DE | 10 2010 012 682 A1 | 9/2011 |

OTHER PUBLICATIONS

Yang et al., "Fast and stable enhancement of the far-field peak power by use of an intracavity deformable mirror," *Applied Physics B, Lasers and Optics*, 2010, pp. 591-595.

* cited by examiner

*Primary Examiner* — Tod T Van Roy
*Assistant Examiner* — Marcia Golub-Miller
(74) *Attorney, Agent, or Firm* — Oliff PLC

(57) ABSTRACT

A Laser device with phase front regulation, including a resonator with a beam path, a laser medium located within the resonator, and a phase front regulating unit located within the resonator; a coupling element; an uncoupling element; and phase front controller and a phase front sensor. A measuring laser beam can impact first the coupling element, then the laser medium, then the phase front regulating unit, then the uncoupling element, and then the phase front sensor. The disturbance of the phase front of the laser medium is transferable to the measuring laser beam. The disturbance of the measuring laser beam and the working laser beam can be corrected by the phase front regulating unit. Sensor data can be received from the phase front sensor and can be processed by the phase front controller. Regulating unit signals for the phase front regulating unit can be generated by the phase front controller.

9 Claims, 3 Drawing Sheets

LASER DEVICE WITH PHASE FRONT REGULATION

BACKGROUND OF THE INVENTION

The invention is related to a laser device with phase front regulation. A laser medium, which is designed for high laser beam power, generates thermal and thermomechanical phase front disturbances. In other words, a disturbance value with respect to the laser beam phase front emanates from the laser medium itself. This leads to poor beam quality. If we focus a laser beam obtained in this way on a distant object, high losses occur, because the necessary intensities are not obtained at the target. This problem affects both the military area of laser weapons and industrial cutting and welding applications. To correct the phase front disturbance caused by the laser medium, adaptive optics is necessary.

US 2009/0028198 A1 describes a laser weapon with phase front regulation. In order to attack an airborne target, a high-power laser beam must penetrate the Earth's atmosphere. In so doing, atmospheric turbulence changes the phase front of the laser beam; this reduces the laser beam quality and thereby the effectiveness of the laser weapon. Phase front regulation regulates the already generated laser beam so that a predetermined phase front is present at the target. A phase front regulating unit, a deformable mirror, is provided for the purpose of modifying the laser beam phase front in such a way that the disturbance value of the atmospheric turbulence is canceled. The phase front regulation uses the same high-power laser beam which is directed at an airborne target. The reflected laser beam is measured with the phase front sensor. The sensor values are evaluated by a phase front controller, in order to generate regulating unit signals for the deformable mirror.

DE 699 19929 T2 and DE 10 2007 049436 B4 concern for additional laser weapons with phase front regulation to compensate for the effects of atmospheric disturbances on the laser beam.

US 2006/0239312 AI concerns the area of optoelectronic telecommunications engineering and makes use of semiconductor lasers with phase front regulation.

US 2010/10117009 A1 concerns a laser installation for semiconductor chip manufacturing.

BRIEF SUMMARY OF THE INVENTION

This laser installation produces extremely fine structures. A high-power pulsed light beam with a short wavelength in the extreme ultraviolet (EUV) range is used. For this purpose, an EUV conversion material is irradiated with a working laser beam. Starting from an already generated laser beam, the working laser beam is obtained through a first amplification by means of a principal oscillator and a subsequent amplification by means of booster amplifiers. The lenses which are passed through on the way to the EUV conversion material absorb part of the laser beams and are considerably heated thereby. As a result, the beam positioning and the curvature of the phase front become degraded. For this reason, the laser installation is provided with regulation. The regulation makes use of a measuring laser beam which is switched in before the booster amplifiers. The measuring laser beam is conducted to a phase front sensor on the side of the beam path nearest the workpiece, whereby the phase front sensor is connected to a phase front controller which is designed to conduct regulation unit signals to the regulation unit. The use of high-resolution phase front sensors and regulating units with deformable mirrors is described. Through this measuring laser beam phase front regulation, a situation is achieved whereby subsequent pulses of the working laser beam exhibit good beam quality. Simple regulation is not possible, because the disturbance that is to be corrected are caused by the imaging lenses, which are arranged in the section of the beam between the phase front regulating unit and the phase front sensor. In other, more general words, there is no constant transfer function between the sensor and the regulating unit.

A laser device with phase front regulation is known from a scientific article (Applied Physics B, Lasers and Optics, 2010, pages 591-595, P. Yang et al., "Fast and stable enhancement of the far-field peak power by use of an intracavity deformable mirror"). A laser medium is arranged within a resonator. The resonator exhibits a totally reflecting and a partly reflecting mirror. The totally reflecting mirror is simultaneously a deformable mirror, and therefore a phase front regulating unit. The partly reflecting mirror enables the uncoupling of the laser beam. A partial beam is uncoupled therefrom and directed to a phase front sensor. Its sensor data are input to a phase front controller. The scientific article describes in great detail that any change in the phase front regulating unit changes the laser modes within the resonator.

This in turn changes the temperature distribution within the laser medium and thereby also changes its optical properties. The article further states that it is not possible to determine the regulating unit signals merely by measuring the phase front of the laser beam which exits from the resonator, because there is no precise mathematical model for this. In order to be able to regulate the phase front anyway, the phase front controller uses a special algorithm.

An older application, DE 10 2010 012 682.9, by this applicant, describes phase front regulation by means of a neuronal network for various areas of applications.

The starting point for the present invention is the closest prior art, as described in DE-G 92 15 361.5. In that publication, a phase front regulation is described, in order to compensate for thermal and thermomechanical phase front disturbances in a laser medium by means of a laser device. The laser medium is located within a resonator, which consists of two resonator mirrors. One of the resonator mirrors is simultaneously a phase front regulating unit. A beam splitter is located between the laser medium and the phase front regulating unit. That uncoupled a partial beam from the laser beam coming from the laser medium. The partial beam then impacts a phase front sensor.

Sensor data from the phase front sensor are then transmitted to a phase front controller. The phase front controller produces regulating unit signals for the phase front regulating unit. The correction of the phase front takes place within the laser resonator. The resonator is thereby stable, notwithstanding the thermal effects of the laser medium. Deterioration of the laser performance quality is thereby avoided. Regulation of the laser beam is only possible when a laser beam is generated. Pauses cannot be used for regulation of the phase front. Similarly, because the laser medium is located in a beam path segment between the phase front regulating unit and the phase front sensor, no optically constant relationship can prevail in that beam path segment. Because this means that no constant transfer function can take place in that beam path segment, regulation becomes difficult.

The objective of the invention, as the next step forward from the closest prior art, as described in DE-G 92 15 361.5, is based on the task of designing a laser device with a phase front regulation in such a way as to increase the possibility of regulation.

The task is solved according to the invention by a laser device with phase front regulation, wherein the laser device includes a) a resonator with a beam path, a laser medium located within the resonator for generation of a working laser beam, and a phase front regulating unit located within the resonator, b) a coupling element, designed in such a way that a measuring laser beam of a measuring laser device is coupled into the beam path of the resonator, c) an uncoupling element, designed in such a way that the measuring laser beam is uncoupled from the resonator, d) a phase front controller and a phase front sensor; and wherein the laser device is designed in such a way, 1) that the measuring laser beam will impact the coupling element first, then the laser medium, then the phase front regulating unit, then the uncoupling element, and then the phase front sensor, 2) that the disturbance of the phase front of the laser medium is transferred to the measuring laser beam, 3) that the disturbance of the measuring laser beam, and thereby that of the working laser beam, is corrected by the phase front regulating unit, 4) that sensor data is received from the phase front sensor and is processed by the phase front controller, and 5) that regulating unit signals for the phase front regulating unit is generated by the phase front controller.

The advantages of the invention are as follows:

a) Admittedly, the regulation takes place with the help of the measuring laser beam. Nonetheless, the phase front regulating unit corrects the working laser beam in the same way.

b) The phase front regulation uses a measuring laser beam. This means that, in pauses, when no working laser beams can be generated, the phase front can be corrected with the help of the measuring laser beam. This also means that cooling effects in the laser medium can be taken into account, when it is not in operation.

c) Because of measuring laser beam is used for phase front regulation, and attractively priced phase front sensor, such as one based on CCD/CMOS, can be used.

d) In addition, a measuring laser beam can be adjusted precisely to the phase front sensor response area.

e) Furthermore, the measuring laser beam and ensures that the regulation is independent of the power and mode division of the working laser beam. This means that both stable and unstable laser resonators can be used.

f) The measuring laser beam impacts first the coupling element, then the laser medium, then the phase front regulating unit, then the uncoupling element, and then the phase front sensor.

As a function of the sequence in which the optical elements are arranged, no disturbance values or time-delaying dead segment affect the measuring laser beam in the beam path section between the phase front regulating unit and the phase front sensor. Accordingly, the regulating unit data can be simply correlated with sensor data.

In more concrete terms, a relationship between a multidimensional sensor data record of the phase front sensor and a multidimensional, correcting regulating unit data record can be simply and rapidly established—for example, in the form of a database.

g) A change in the laser medium does not require new calibration of the phase front regulation.

According to one embodiment of the invention, the working laser beam exhibits a frequency which is different from the measuring laser beam frequency. In addition, the coupling element and/or the uncoupling element are constructed in a wave-selective manner. This measure enables the measuring laser beam to be coupled and/or uncoupled independently of the working laser beam.

According to one embodiment of the invention, the resonator exhibits a first resonator mirror, located adjacent to the laser medium, and a second resonator mirror, located adjacent to the phase front sensor. This means that the first resonator mirror is designed as a coupling element and/or the second resonator mirror is designed as an uncoupling element. Through this measure, it is possible to save an additional element, such as the beam splitter, for coupling and/or uncoupling the measuring laser beam, because the first and/or second resonator mirror takes over this additional function. Similarly, the optical losses are reduced.

According to one embodiment of the invention, sensor data can be received from the phase front sensor and can additionally be processed by a power controller of the measuring laser device. The power of the measuring laser beam can thereby be optimally adjusted on the phase front sensor. This makes it possible to operate the phase front sensor without an overexposure in its optimal operating range.

According to one embodiment of the invention, a second phase front sensor is provided, which can be impacted with a partial beam of the working laser beam, in such a way that sensor data which can be received from the second phase front sensor can additionally be processed by the phase front controller. This measure increases the accuracy of the phase front controller.

According to one embodiment of the invention, the measuring laser beam and the working laser beam have not only the same phase front form, but also the same intensity profile. The phase front form can preferably be planar, but can also be, for example, spherical. Because the phase front is the controlled variable, the measuring laser beam and the working laser beam must exhibit a matching phase front form. The intensity profile can be, for example, rectangular or Gaussian. The intensity profile is also related to a specific beam diameter. The measuring laser beam and the working laser beam also have a matching intensity profile, because this gives both beams an identical spread. This enables good correction of the working laser beam.

Further in this application, the term "telescope" is used. The term "telescope", in this application, should be broadly interpreted. The term "telescope" should be considered as including any optical system with imaging properties which consists of one or more optical elements. A telescope, for example, can be accomplished with spherical or aspherical optic lenses, or with spherical or aspherical mirrors. The angle of incidence can be perpendicular or not perpendicular.

According to one embodiment of the invention, the phase front regulating unit exhibits a correction plane and the laser medium exhibits a fixed phase disturbance plane. In addition, a telescope is located before the phase front regulating unit for the purposes of beam adjustment, by means of which the phase disturbance plane can be optically imaged onto the correction plane. In present-day phase front regulating units, the working surface is greater than the cross-section of the measuring laser beam. The telescope adjusts the areas to each other by widening the beam. The correction plane can be optically imaged onto the measuring plane of the phase front sensor, thereby achieving an unique, diffraction independent relationship between these planes.

According to one embodiment of the invention, the phase front sensor exhibits a measuring plane. In addition, a telescope is located before the phase front sensor for the purposes of beam adjustment, by means of which the correction plane can be optically imaged onto the measuring plane. In present-day phase front sensors, the working surface is greater than the cross-section of the measuring laser beam. The telescope adjusts the areas to each other by widening the beam. The correction plane can be optically imaged onto the measuring plane of the phase front sensor, thereby achieving an unique, diffraction-independent relationship between these planes.

This favors an optically fixed relationship or a constant transfer function in the beam path section between the phase front regulating unit and the phase front sensor. According to one embodiment of the invention, a beam transformer is located within the resonator, by means of which it is possible to generate a Gaussian intensity profile in the direction of the working laser beam outcoupling and a rectangular intensity profile in the direction of the laser medium and the phase front regulating unit. This achieves better energy extraction from the laser medium. Without an imaging telescope, it would be difficult to keep the diffraction losses of a rectangular intensity profile as small as possible. Accordingly, telescopes play two roles in cases involving the use of a beam shaping optics. Firstly, they optimize the correction of the phase disturbances; secondly, they reduce diffraction losses within the resonator.

BRIEF DESCRIPTION OF THE DRAWINGS

Embodiments of the invention are described in greater detail below, with the help of the drawings, which show.

DETAILED DESCRIPTION OF THE INVENTION

Figure 1A:
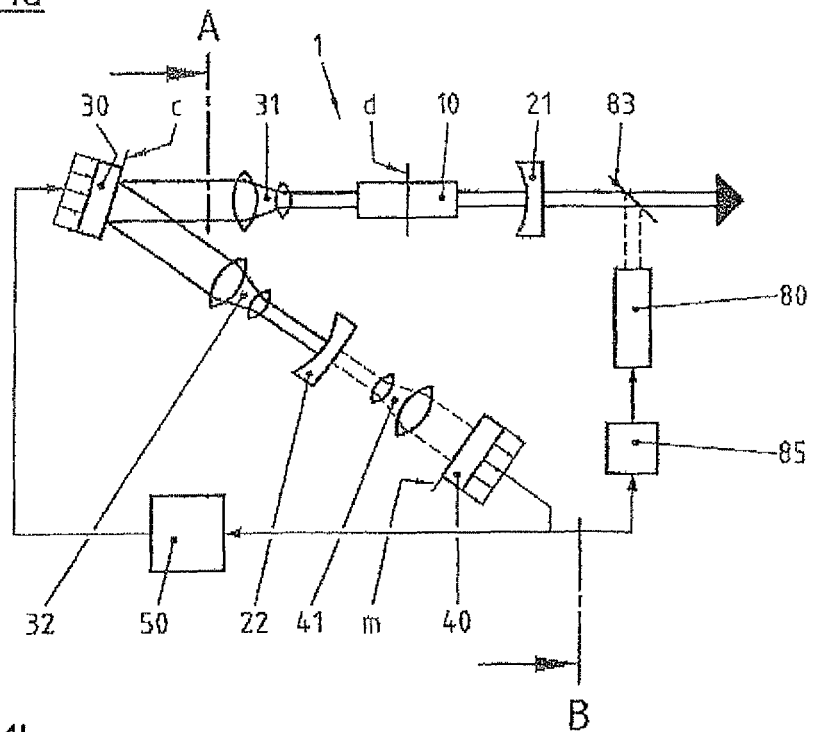
FIG. 1a: a laser device with phase front regulation, in which the phase front regulating unit is installed under an angle.

FIG. 1a shows a laser device 1 with phase front regulation. The laser device 1 includes the following elements:

A resonator with a beam path, a laser medium 10 located within the resonator for the generation of a working laser beam, and a phase front regulating unit 30 located within the resonator. The resonator exhibits a first resonator mirror 21, located adjacent to the laser medium, and a second resonator mirror 22, located adjacent to the phase front sensor 40. The working laser beam is uncoupled by means of the first resonator mirror 21. Relative to the working laser beam, the resonator mirror 21 is partly reflecting and partly transparent, and the resonator mirror 22 is totally reflecting. The aforementioned phase front regulating unit 30 is a deformable mirror. This can be a piezo mirror, or a piezoelectric or electrostatic deformable mirror.

A coupling element designed in such a way that a measuring laser beam can be coupled from a measuring laser device 80 in the beam path of the resonator. In the present embodiment, the first resonator mirror 21 is designed as a coupling element. The resonator mirror 21 lets the measuring beam coming from the beam splitter 83 through. In order to be able to separate the measuring laser beam from the working laser beam, the frequency of the working laser beam is different from the frequency of the measuring laser beam and the coupling element—that is, the first resonator mirror 21 is constructed in a wave-selective manner.

An uncoupling element designed in such a way that the measuring laser beam can be uncoupled from the resonator. In the present embodiment, the second resonator mirror 22 is designed as an uncoupling element. The second resonator mirror 22 is also constructed in a wave-selective manner. Being designed in such a way, the resonator mirror 22 reflects the working laser beam, but lets the measuring laser beam through.

A phase front controller 50 and a phase front sensor 40. The phase front controller 50 may include a computer with software. The phase front controller 50 may also include an FPGA (field programmable gate array) circuit, in which a matrix algorithm is realized.

On the basis of the data from the phase front sensor 40, this circuit directly or indirectly calculates the necessary correction function for the phase front regulating unit 30. The phase front controller 50 can also exhibit a neuronal network based on a chip. The phase front sensor 40 is a sensor based on CCD/CMOS and equipped with a micro-lens array (Shack-Hartmann sensor), or a sensor based on CCD/CMOS with a four-wave lateral shearing interferometry device. According to the measuring laser beam wavelength, other two-dimensional, image-producing sensors can also be used.

The laser device 1 is designed as follows:

In operation, the measuring laser beam impacts first the coupling element—that is, the first resonator mirror 21, then the laser medium 10, then the phase front regulating unit 30, then the uncoupling element—that is, the second resonator mirror 22, and then the phase front sensor 40.

The disturbance of the phase front of the laser medium 10 can be transferred to the measuring laser beam. In other words, the measuring laser beam takes on the internal phase disturbances of the laser medium 10.

The disturbance of the measuring laser beam, and thereby that of the working laser beam, can be corrected by the phase front regulating unit 30.

Sensor data can be received from the phase front sensor 40 and processed by the phase front controller 50.

Regulating unit signals for the phase front regulating unit 30 can be generated by the phase front controller 50.

The wavelengths of the working and measuring laser beams are not too different, so that the phase front regulating unit 30 compensates for the phase disturbances of both the measuring laser beam and the working laser beam in the laser medium 10. In the case of a laser medium 10 made of an Er:YAG crystal with an emission wavelength of 1645 nm, an Nd:YAG crystal with an emission wavelength of 1064 nm is used in the measuring laser device 80.

Alternatively, for an even better correction, it is possible to use a narrow-band fiber laser with 1555 nm, working together with a narrow-band wave selection at 1555 nm in the first resonator mirror 21 and in the second resonator mirror 22, which simultaneously serve as a wave selective coupling and/or uncoupling element for the measuring laser beam. This is because too great a difference between the wavelengths of the working and measuring laser beams would cause different dispersion effects in the laser medium 10. The changes in the refractive index, which would be caused by temperature differences in the laser medium 10, would give rise to phase disturbances of different intensity in the measuring of the working laser beams.

The sensor data which can be received from the phase front sensor 40 can additionally be processed by a power controller 85 of the measuring laser device 80, in order to make it possible to simply adjust the power of the measuring laser beam to the dynamic range of the phase front sensor 40. This enables an overexposure of the phase front sensor 40 to be avoided. If a Shack-Hartmann sensor is used as a phase front sensor 40, a dot pattern is obtained, whereby the value of the intensity of the dots can be processed by the power controller 85.

The measuring laser beam and the working laser beam have not only the same phase front form, but also the same intensity profile. Accordingly, in the case of a planar phase front form of the working laser beam with a Gaussian intensity profile, a measuring laser beam which also has a planar phase front form and a Gaussian intensity profile is coupled into the resonator. Regulation of the phase front of this measuring laser beam to a planar phase front form at the phase front sensor 40 accordingly enables compensation for the disturbances in the laser medium 10.

The phase front regulating unit 30 exhibits a correction plane c, and the laser medium 10 exhibits a fixed phase disturbance plane d. The correction plane c is the mirror surface of the deformable mirror. The fixed phase disturbance plane d, according to the resonator structure, lies within the laser medium 10 or on an end face of the laser medium 10. As will be described within the framework of FIG. 1b, in cases where a beam transformer is used, the phase disturbance plane d can hypothetically be placed at the output of the beam transformer, which exhibits a rectangular profile. A telescope 31 is located before the phase front regulating unit 30 for the purposes of beam adjustment, by means of which the phase disturbance plane d can be optically mapped onto the correction plane c.

The phase front sensor 40 exhibits a measuring plane m. The measuring plane m is the sensor surface of the phase front sensor 40. In cases where a Shack-Hartmann sensor is used, this is the plane of the micro-lens array. A telescope 41 is located before the phase front sensor 40 for the purposes of beam adjustment, by means of which the correction plane c can be optically mapped onto the measuring plane m.

An additional telescope 32 is necessary as a function of the embodiment. Its task consists of adjusting the beam diameter on the second resonator mirror 22 and optically mapping the correction plane c of the phase front regulating unit 30 to the mirror plane of the second resonator mirror 22.

The telescopes 31, 32 and 41 (with respect to the embodiment according to FIG. 1a) consists, in the simplest case, of two lenses with an appropriate focal length, so that they transform a collimated incoming laser beam into a collimated outgoing laser beam. The telescopes 31, 32 and 41 have the function of mapping the phase disturbance plane d, the correction plane c and the measuring plane m into each other. For high laser power, it is advantageous to use curved mirrors, which can be impacted at an angle, instead of lenses.

Common to all of the embodiments is the fact that a telescope 31 is arranged before a wavefront regulating unit 30 and a telescope 41 is arranged before a wavefront sensor 40.

Also, to all of the embodiments is the fact that these telescopes 31 and 41 at least contribute to the mapping of the phase disturbance plane d, the correction plane c and the measuring plane m into each other.

In the embodiment according to FIG. 1a, the working laser beam passes through twice. This double passage means that the working laser beam takes on the disturbances of the laser medium 10 twice, impacts the phase front regulating unit 30 twice and is thereby corrected.

The first pass-through takes place on the way to the resonator mirror 22, and the second passthrough takes place on the way back from the resonator mirror 22.

Now that FIG. 1a has been described in considerable detail, the remaining embodiments shown in the drawings will be explained below. In so doing, identical parts are given identical reference numbers. In order to avoid repetition, only differences and particularities, relative to that which has already been set forth, will be explained.

Figure 1B:
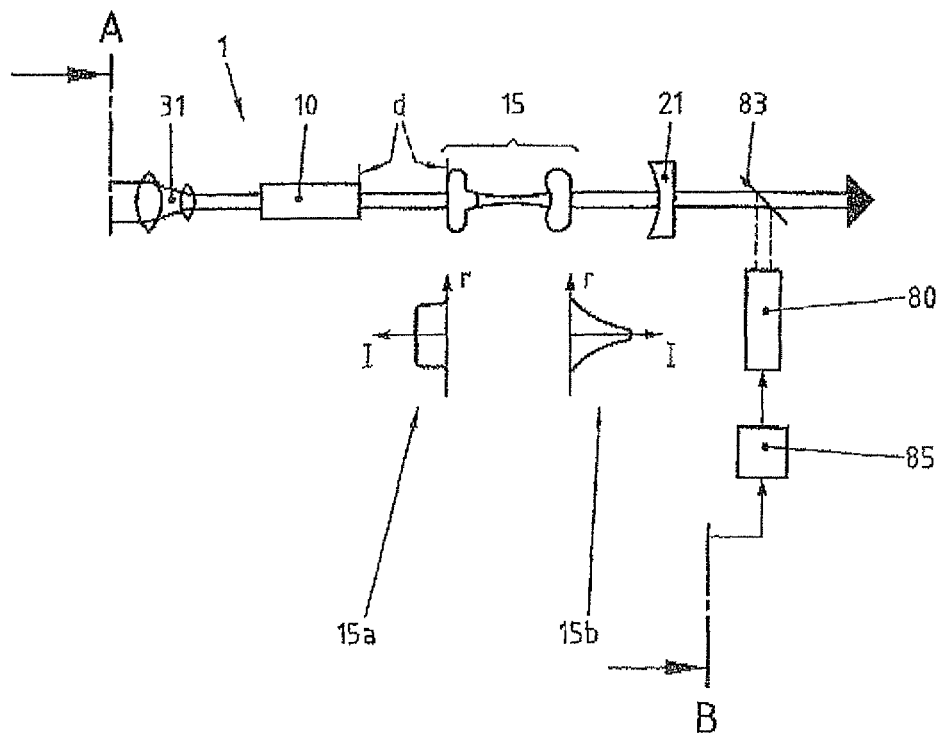
FIG. 1b: a variant form of the laser device according to FIG. 1a, in which a beam transformer is also present within the resonator.

FIG. 1b shows a variant form of the laser device according to FIG. 1a with respect to the beam path section A-B. In FIG. 1b, a beam transformer 15 is also located within the resonator, by means of which it is possible to generate a Gaussian intensity profile in the direction of the working laser beam uncoupling and a rectangular intensity profile in the direction of the laser medium 10 and the phase front regulating unit 30. This is illustrated in small diagrams 15a and 15b, in which the intensity 1 of the working or measuring laser beam is plotted against a radius r. The beam transformer 15 allows large resonator lengths and simultaneous extraction in the laser medium 10. As a function of the beam transformer 15, the phase disturbance plane d is not arranged in the middle of the laser medium 10, which is rod-shaped and exhibits two and faces. Rather, the phase closer to the beam transformer 15 is configured as a phase disturbance plane d. Alternatively, the phase disturbance plane d can be located directly on the side of the beam transformer 15 which is closer to the laser medium 10. This is illustrated by a dashed line from d to the appropriate side of the beam transformer 15. In both cases, the phase front is corrected relative to a phase disturbance plane d, which is especially suitable for the beam transformer 15, because no disturbance value of the laser medium 10 now influences the working laser beam or the measuring laser beam between the phase disturbance plane d and the beam transformer 15.

Figure 1C:
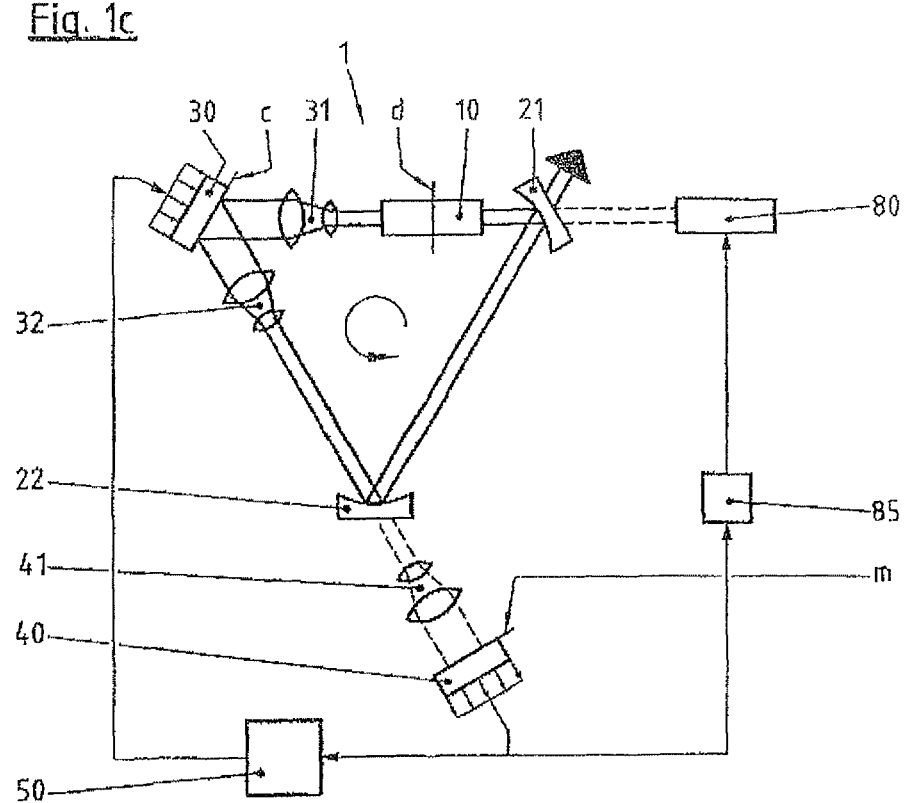
FIG. 1c: a variant form of the laser device according to FIG. 1a, in which the resonator is in the form of a ring resonator.

FIG. 1c shows a variant form of the laser device according to FIG. 1a the variation concerns the formation of the resonator as a ring resonator. As a result of the ring resonator, working laser beam passes through only once. This single passage means that the working laser beam takes on the disturbances of the laser medium 10 only once, impacts the phase front regulating unit 30 only once and is thereby corrected, before it is uncoupled via the partially transparent mirror 21. A beam splitter 83, as in FIG. 1a, is not necessary in the embodiment according to FIG. 1c, because the coupling of the measuring laser beam and the uncoupling of the working laser beam takes place at an angle to each other.

Figure 2A:
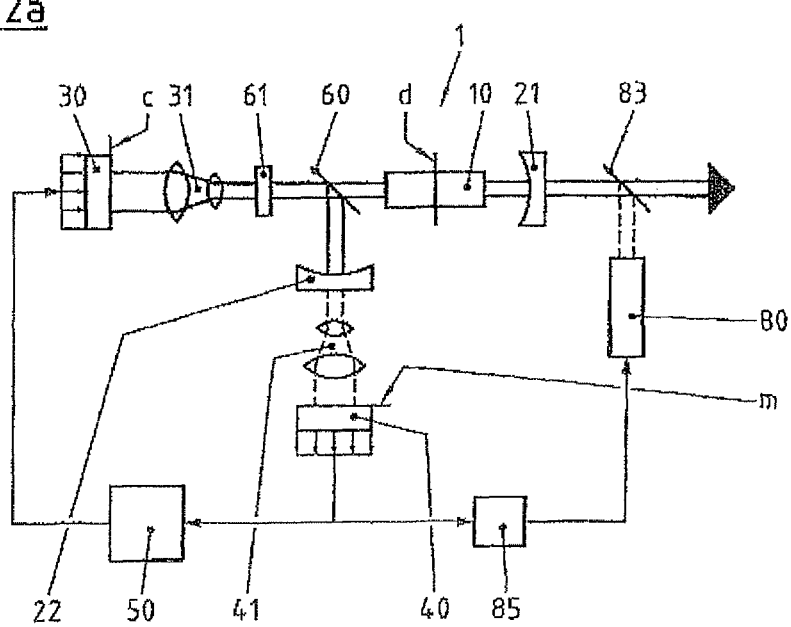
FIG. 2a: a variant form of the laser device according to FIG. 1a, in which the phase front regulating unit is installed for perpendicular reflection.

FIG. 2a shows an additional variant form of the laser device according to FIG. 1a, whereby the phase front regulating unit 30 is perpendicularly impacted. This results in a more precise optical mapping between the phase disturbance plane d, the correction plane c and the measuring plane m. This leads to a reduced control deviation. A polarization beam splitter 60 and a quarter-wave plate 61 have the function of deflecting the working and measuring laser beam, after an impact on the phase front regulating unit 30, in the direction of the second resonator mirror 22. While the measuring laser beam is uncoupled from the second resonator mirror 22, the working laser beam is again deflected from the second resonator 22, via the polarization beam splitter 60 and the quarter-wave plate 61, onto the phase front regulating unit 30 and reflected by it. After again passing through the quarter-wave plate 61, the working laser beam has the appropriate polarization, so that it passes through the polarization beam splitter 60 again in the direction of the laser medium 10. After passing through the laser medium 10, it is uncoupled from the partially-transparent resonator mirror 21. A telescope 32, which is necessary in the embodiment according to FIG. 1a, thereby become superfluous.

Figure 2B:
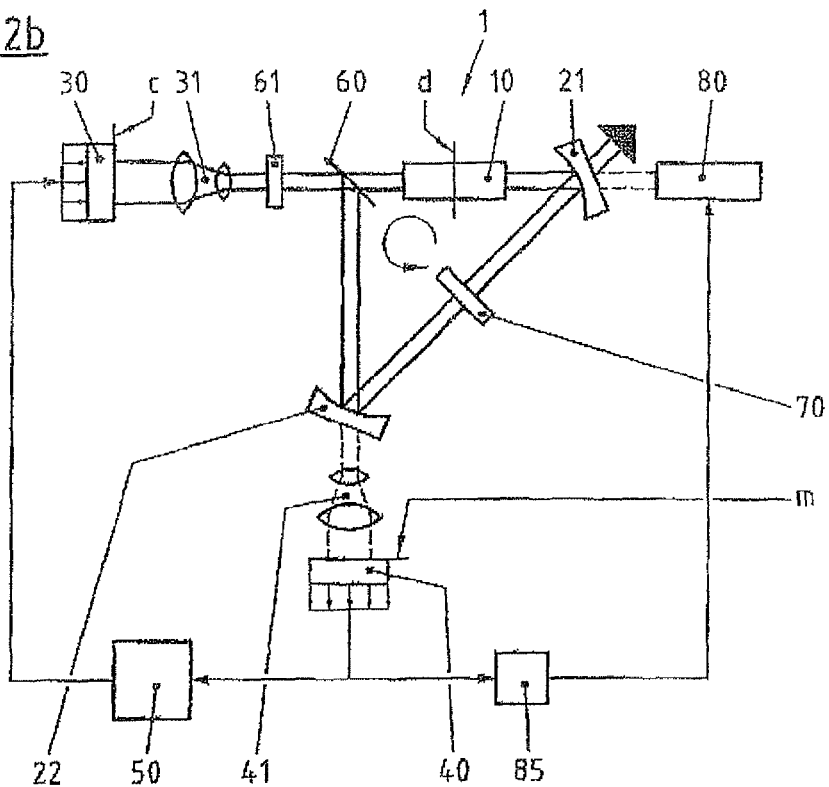
FIG. 2b: a variant form of the laser device according to FIG. 2a, in which the resonator is in the form of a ring resonator.

FIG. 2b shows a variant form of the laser device according to FIG. 2a. In FIG. 2b, as in FIG. 1c, the resonator is in the form of a ring resonator. Again, the working laser beam passes through only once. A half-wave delay Jens 70 has the function, on the basis of the quarter-wave plate 61 which has already been passed through twice, of obtaining a total phase shift of exactly one wavelength. The half-wave plate 70 accordingly cancels out the phase shifts of the quarter-wave plate 61.

Figure 2C:
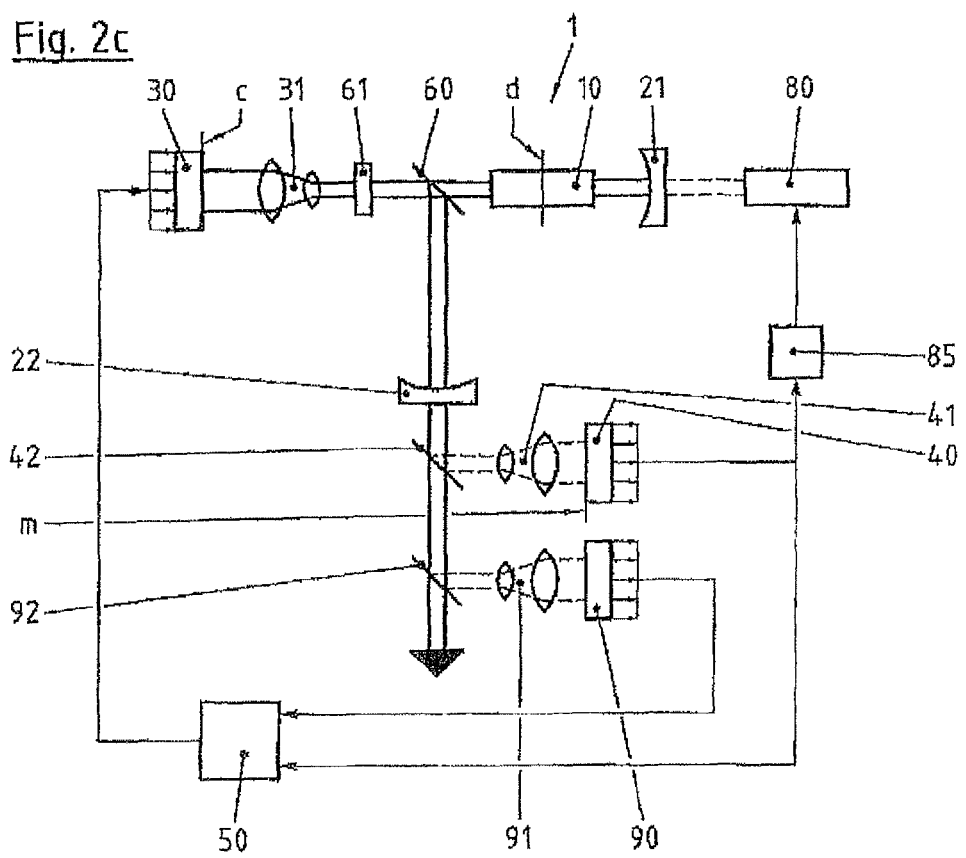
FIG. 2c: a variant form of the laser device according to FIG. 2a, in which a second phase front sensor is used.

FIG. 2c shows a variant form of the laser device according to FIG. 2a. In this variation, a more sophisticated regulation is provided. To this end, the laser device 1 exhibits a second phase front sensor 90, which can be impacted with a partial beam of the working laser beam. In this way, the sensor data received from the second phase front sensor 90 can additionally be processed by the phase front controller 50. The partial beam of the working laser beam is conducted, by means of a wave-selective beam splitter 92, via a telescope 91, to the phase front sensor 90. The uncoupling of the measuring laser beam takes place via a wave-selective beam splitter 42.

On the basis of the design of the laser device 1 with a measuring laser beam and the sequence in which the optical elements are arranged, so that the beam path section of the measuring laser beam, starting with the phase front regulating unit 30 and up to the phase front sensor 40, remains optically constant and unchangeable, a generation of data for the phase front controller 50 is simply accomplished before the startup of the laser device 1.

An example for the operation of the laser device 1 according to each of the described embodiments is as follows:

Startup of the measuring laser device 80 and constant operation of the measuring laser device 80. Constant operation of the phase front regulation.

Constant readjustment of the measuring laser beam power to an optimal dynamic range of the phase front sensor 40.

Pulsed generation of the working laser beam.

Adjustment of the phase front both during the generation of a pulse of a working laser beam and in the pauses of the laser medium 10.

LIST OF REFERENCE NUMBERS

1 Laser device
10 Laser medium
15 Beam transformer
15a Diagram showing a rectangular intensity profile
15b Diagram showing a Gaussian intensity profile
21 Resonator mirror adjacent to the laser medium
22 Resonator mirror adjacent to the phase front regulating unit
30 Phase front regulating unit
31 Telescope
32 Telescope
40 Phase front sensor
41 Telescope
42 Beam splitter
50 Phase front controller
60 Polarization beam splitter
61 Quarter-wave plate
71 Half-wave plate
80 Measuring laser device
83 Beam splitter
85 Power controller
90 Phase front sensor
91 Telescope
d Phase disturbance plane
c Correction plane
m Measuring plane

The invention claimed is:

1. Laser device with phase front regulation, the laser device comprising:
   a) a resonator with a beam path, a laser medium located within the resonator for generation of a working laser beam, a first resonator mirror located adjacent to the laser medium, and a second resonator mirror located adjacent to a phase front sensor, and a phase front regulating unit located within the resonator, the beam propagating back and forth many times within said beam path,
   b) a coupling element configured to couple a measuring laser beam of a measuring laser device into the beam path of the resonator,
   c) an uncoupling element configured to uncouple the measuring laser beam from the resonator, and
   d) a phase front controller and the phase front sensor; and
   wherein the resonator comprises:
      1) the measuring laser beam first impacts the coupling element, then the laser medium, then the phase front regulating unit, then the uncoupling element, and then the phase front sensor,
      2) a disturbance of the phase front of the laser medium is transferred to the measuring laser beam,
      3) a disturbance of the measuring laser beam, and thereby that of the working laser beam, is corrected by the phase front regulating unit,
      4) sensor data is received from the phase front sensor and is processed by the phase front controller, and
      5) regulating unit signals for the phase front regulating unit generated by the phase front controller.

2. Laser device according to claim 1, wherein the working laser beam has a frequency which is different from the frequency of the measuring laser beam and the coupling element and/or the uncoupling element are constructed in a wave-selective manner.

3. Laser device according to claim 1, wherein the first resonator mirror is designed as a coupling element and/or the second resonator mirror is designed as an uncoupling element.

4. Laser device according to claim 1, wherein sensor data is received from the phase front sensor and is additionally processed by a power controller of the measuring laser device.

5. Laser device according to claim 1, wherein a second phase front sensor is provided, which is impacted with a partial beam of the working laser beam, in such a way that sensor data which is received from the second phase front sensor is additionally processed by the phase front controller.

6. Laser device according to claim 1, wherein the measuring laser beam and the working laser beam have not only the same phase front form, but also the same intensity profile.

7. Laser device according to claim 1, wherein the phase front regulating unit includes a correction plane (c) and the laser medium includes a fixed phase disturbance plane, and a telescope is located before the phase front regulating unit for the purposes of beam adjustment, by means of which the phase disturbance plane is optically mapped onto the correction plane.

8. Laser device according to claim 1, wherein the phase front sensor includes a measuring plane and the phase front regulating unit includes a correction plane, and a telescope is located before the phase front sensor for the purposes of beam adjustment, by means of which the correction plane is optically mapped onto the measuring plane.

9. Laser device according to claim 1, wherein a beam transformer is located within the resonator, in such a way that a Gaussian intensity profile is generated in the direction of the working laser beam outcoupling and a rectangular intensity profile in the direction of the laser medium and the phase front regulating unit.

* * * * *